US009560687B2

(12) United States Patent
Wallentin et al.

(10) Patent No.: US 9,560,687 B2
(45) Date of Patent: Jan. 31, 2017

(54) NETWORK NODES, A USER EQUIPMENT AND METHODS THEREIN FOR ENABLING D2D COMMUNICATION

(71) Applicant: Telefonaktiebolaget L M Ericsson (publ), Stockholm (SE)

(72) Inventors: Pontus Wallentin, Linköping (SE); Qingyu Miao, Beijing (CN); Qianxi Lu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 14/408,270

(22) PCT Filed: Dec. 11, 2013

(86) PCT No.: PCT/SE2013/051486
§ 371 (c)(1),
(2) Date: Dec. 15, 2014

(87) PCT Pub. No.: WO2015/088406
PCT Pub. Date: Jun. 18, 2015

(65) Prior Publication Data
US 2016/0219632 A1   Jul. 28, 2016

(51) Int. Cl.
*H04W 4/00* (2009.01)
*H04W 76/02* (2009.01)
(Continued)

(52) U.S. Cl.
CPC ....... *H04W 76/023* (2013.01); *H04W 36/0066* (2013.01); *H04W 48/10* (2013.01); *H04W 36/14* (2013.01); *H04W 76/043* (2013.01)

(58) Field of Classification Search
CPC .................... H04W 76/023; H04W 48/10
(Continued)

(56) References Cited

U.S. PATENT DOCUMENTS

2011/0258313 A1   10/2011   Mallik et al.
2012/0213183 A1*  8/2012   Chen ................ H04W 72/1278
                                                         370/329
(Continued)

FOREIGN PATENT DOCUMENTS

EP         2591619 A1    1/2012
WO    WO 2011/051745 A1    5/2011
(Continued)

OTHER PUBLICATIONS

International Search Report, PCT Application No. PCT/SE2013/051486, Aug. 7, 2014.
(Continued)

*Primary Examiner* — Marcos Batista
(74) *Attorney, Agent, or Firm* — Myers Bigel, P.A.

(57) ABSTRACT

A method performed by a network node for enabling network-assisted Device-to-Device, D2D, communications between user equipments configured to be in a wireless telecommunications network is provided, wherein the network node is configured according to a Radio Access Technology, RAT, that cannot be used for D2D communications. The network node determines D2D assistance information to enable network-assisted D2D communications by the network node. The network node then transmits the D2D assistance information to at least one user equipment. A user equipment, another network node and methods performed therein are also provided.

18 Claims, 7 Drawing Sheets

(51) Int. Cl.
*H04W 36/00* (2009.01)
*H04W 48/10* (2009.01)
*H04W 36/14* (2009.01)
*H04W 76/04* (2009.01)

(58) Field of Classification Search
USPC .......................................... 455/434; 370/338
See application file for complete search history.

(56) References Cited

U.S. PATENT DOCUMENTS

2013/0150051 A1    6/2013  Van Phan et al.
2013/0322388 A1*  12/2013  Ahn .................... H04W 76/023
    370/329

FOREIGN PATENT DOCUMENTS

| WO | WO 2011/109027 A1 | 9/2011 |
| WO | WO 2011/147462 A1 | 12/2011 |
| WO | WO 2013/055271 A1 | 4/2013 |

OTHER PUBLICATIONS

Written Opinion of the International Searching Authority, PCT Application No. PCT/SE2013/051486, Aug. 7, 2014.

* cited by examiner

NETWORK NODES, A USER EQUIPMENT AND METHODS THEREIN FOR ENABLING D2D COMMUNICATION

CROSS REFERENCE TO RELATED APPLICATION

This application is a 35 U.S.C. §371 national stage application of PCT International Application No. PCT/SE2013/051486, filed on 11 Dec. 2013, the disclosure and content of which is incorporated by reference herein in its entirety.

TECHNICAL FIELD

Embodiments herein relate to the device-to-device, D2D, communication in a wireless communications network. In particular, embodiments herein relate to enabling network-assisted D2D communications between user equipments configured to be in a wireless telecommunications network.

BACKGROUND

Device-to-device communication is a well-known and widely used component of many existing wireless technologies, including ad hoc and cellular networks. Examples include Bluetooth and several variants of the IEEE 802.11 standards suite, such as, WiFi Direct. These systems operate in unlicensed spectrum.

Recently, Device-to-Device (D2D) communication, as an underlay to cellular networks, has been proposed as a means to take advantage of the close proximity of communicating devices, i.e. user equipments, UEs, and at the same time to allow these UEs to operate in a controlled interference environment. In this case, close proximity may typically refer to less than a few tens of meters, but sometimes even up to a few hundred meters.

This direct mode or device-to-device, D2D, communication may demonstrate a number of potential gains over traditional cellular communication. One of these potential gains is capacity. Radio resources, such as, e.g. Orthogonal Frequency-Division Multiplexing, OFDM, resource blocks, between the D2D and cellular layers may be reused, resulting in reuse gains. Also, the D2D link uses a single hop between the transmitter and receiver points as opposed to a double-hop link via a cellular access point, resulting in hop gains. Another potential gain is peak rate. Because of the proximity, and potentially favourable propagation conditions for the D2D link, high peak rates are possible to achieve, resulting in proximity gains. A further potential gain is latency. When UEs communicate over a direct D2D link, forwarding via the cellular access point is short-cut and the end-to-end latency between the UEs is decreased.

It has further been suggested that such D2D communication should share the same spectrum as the cellular system, for example, by reserving some of the cellular uplink resources for D2D communication purposes. That is, locating D2D communication on cellular uplink, UL, resources in a way such that Time-Division Duplex, TDD, is the duplex transmission scheme of the D2D communication. This means that the cellular UL resources would be allocated for D2D communication transmission in both upstream and downstream directions between each D2D pair of UEs in a Time-Division Multiplexed, TDM, manner.

This D2D communication may be established and performed by the D2D pair of UEs only, which is commonly referred to as an ad-hoc mode D2D communication, or be assisted by the network, also referred to as a network-assisted D2D communication.

In the latter, a cellular network may, for example, assist a D2D connection by establishing security of the D2D link and/or partly or fully controlling the setup of the D2D connection, such as, e.g. UE/peer discovery and resource allocation. Further, a cellular network may also assist the D2D communication by controlling the interference environment. For example, if using a licensed operator's spectrum for the D2D communication, higher reliability may be provided than when operating in an unlicensed spectrum. To further assist the D2D connection, the cellular network may also provide synchronization and/or partial or full Radio Resource Management, RRM. The RRM may here, for example, comprise time and/or frequency resource allocation for the D2D communication. However, this network-assisted D2D communication requires that the radio network node is configured with a Radio Access Technology, RAT, according to the LTE standard, that is, a RAT that can be used for D2D communication.

However, today, if there is no coverage provided by a LTE cellular network, the D2D communication will fall back to ad hoc mode D2D communication.

It should also be noted that most of the current LTE UEs support multi-mode communication, i.e. the LTE UEs are capable of communicating also with non-LTE cellular networks, that is, cellular networks utilizing other RATs which cannot be used for D2D communication, such as, e.g. GSM, WCDMA, HSPA.

WO2013055271 discusses D2D communication between UEs when the UEs are in the coverage of a network that lack D2D capabilities. Here, a UE may switch to a neighbouring cell/network with D2D capabilities, and then set up a D2D communication with another UE.

US20130150051 disclose the use of a D2D registration server for UE to register to. The D2D registration server function may in turn connect to different RAN systems to control a D2D connection.

EP2591619 disclose different triggers for a D2D UE/peer discovery procedure utilizing either a push mode, i.e. discovery is triggered periodically, or pull mode, i.e. discovery is triggered by a UE/peer request signal from a UE/peer. The D2D discovery procedure can be implemented with or without assistance from the network.

SUMMARY

It is an object of embodiments herein to provide network-assisted D2D communication to user equipments in a wireless communication network using a different RAT than a RAT that can be used for D2D communication.

According to a first aspect of embodiments herein, the object is achieved by a method performed by a network node for enabling network-assisted Device-to-Device, D2D, communications between user equipments configured to be in a wireless telecommunications network, wherein the network node is configured according to a Radio Access Technology, RAT, that cannot be used for D2D communications. The network node determines D2D assistance information to enable network-assisted D2D communications by the network node, and then transmits the D2D assistance information to at least one user equipment.

According to a second aspect of embodiments herein, the object is achieved by a network node for enabling network-assisted D2D communications between user equipments configured to be in a wireless telecommunications network, wherein the network node is configured according to a RAT that cannot be used for D2D communications. The network node is configured to determine D2D assistance information to enable network-assisted D2D communications by the network node. The network node being further configured to transmit the D2D assistance information to the user equipments or to another network node in the wireless telecommunications network.

According to a third aspect of embodiments herein, the object is achieved by a method performed by a user equipment for configuring a D2D communication with another user equipment in a wireless telecommunications network. The user equipment receives D2D assistance information to enable network-assisted D2D communications when being served by a network node configured according to a RAT that cannot be used for D2D communications, and configures the D2D communication using the D2D assistance information.

According to a fourth aspect of embodiments herein, the object is achieved by a user equipment for configuring a D2D communication with another user equipment in a wireless telecommunications network. The user equipment is configured to receive D2D assistance information to enable network-assisted D2D communications when being served by a network node configured according to a RAT that cannot be used for D2D communications. The user equipment being further configured to configure the D2D communication using the D2D assistance information.

According to a fifth aspect of embodiments herein, the object is achieved by a method performed by a network node for enabling network-assisted D2D communications between user equipments configured to be in a wireless telecommunications network, wherein the network node is configured according to a RAT that can be used for D2D communications. The network node transmits, to another network node, an indication that a user equipment that is to be served by the another network node is engaged in D2D communications, wherein the another network node is configured according to a RAT that cannot be used for D2D communications. The network node then receives, from the another network node, D2D assistance information to enable network-assisted D2D communications for the user equipment by the another network node.

According to a sixth aspect of embodiments herein, the object is achieved by a network node for enabling network-assisted D2D communications between user equipments configured to be in a wireless telecommunications network, wherein the network node is configured according to a RAT that can be used for D2D communications. The network node is configured to transmit an indication that a user equipment that is to be served by another network node is engaged in D2D communications, wherein the another network node is configured according to a RAT that cannot be used for D2D communications. The network node being further configured to receive D2D assistance information to enable network-assisted D2D communications for the user equipment by the network node.

By having network nodes configured according to a RAT that cannot be used for D2D communications and user equipments served thereby to also be configured as described above, the network nodes are enabled to indicate and provide D2D assistance information, such as, e.g. network access related configuration and/or RRM information for D2D communications, to the user equipments in spite of using a RAT that cannot be used for D2D communications.

Hence, network node may provide network-assisted D2D communication to user equipments in a wireless communication network using a different RAT than a RAT that can be used for D2D communication.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 1:
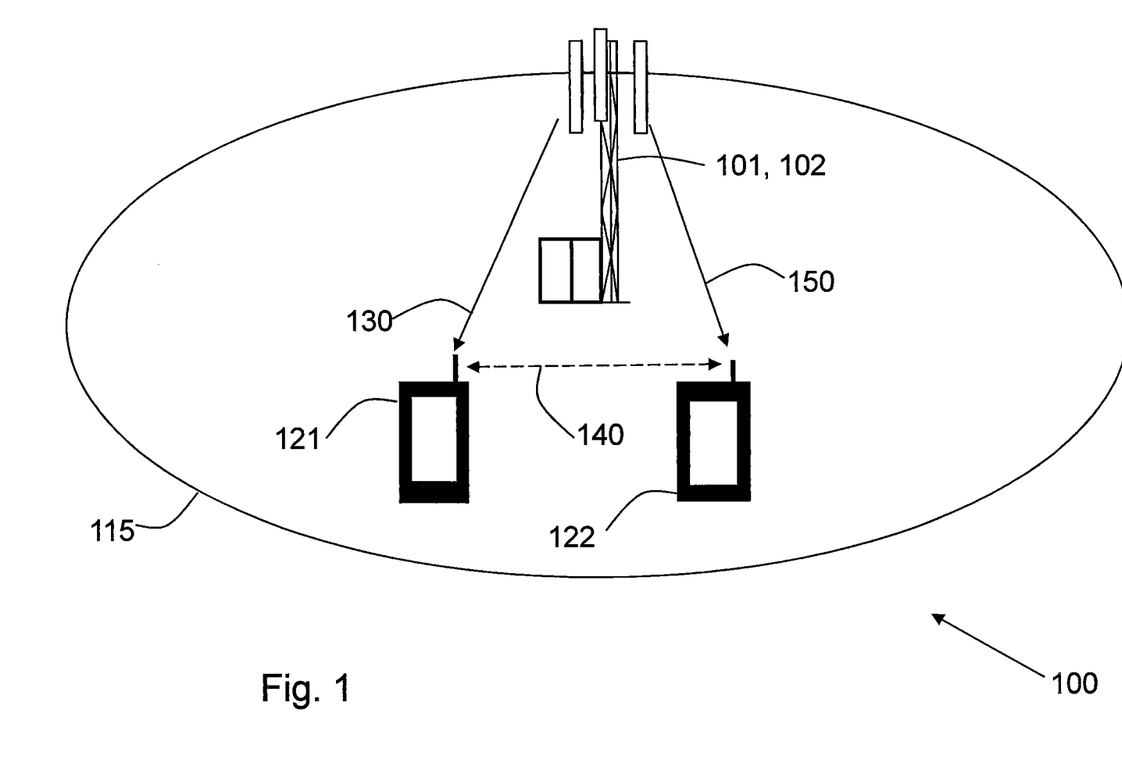
FIG. 1 is a schematic block diagram illustrating embodiments in a wireless communications network.

FIG. 1 depicts a wireless communications network 100 in which embodiments herein may be implemented. In some embodiments, the wireless communications network 100 may be a cellular or wireless telecommunication network, such as, a non-LTE cellular network, i.e. a cellular network utilizing another RAT, such as, e.g. GSM, WCDMA, HSPA, etc.

The wireless communications system 100 comprises a network node 101, 102, which is a radio base station and may therefore also be referred to as a radio base station or base station. The network node 101, 102 serves a cell 115; that is, the network node 110 is capable of serving user equipments, or machine type communication devices, located in the cell 115 of the wireless telecommunications system 100.

A first user equipment 121 is located within the cell 115. The user equipment 121 is configured to communicate within the wireless communications system 100 via the network node 101, 102 over a radio link 130 when present in the cell 115 served by the network node 101, 102. The first user equipment 121 is further capable of communicating with other user equipments, such as, e.g. a second user equipment 122 as described below or another user equipment using wireless D2D communication, over a D2D link 140 (dashed arrow in FIG. 1).

In this example, a second user equipment 122 is also located within the cell 115. However, according to other scenarios, the second user equipment 122 may also be located in another cell which is adjacent to the cell 115. In this example, the second user equipment 122 is configured to communicate within the wireless communications system 100 via the network node 101, 102 over a radio link such as e.g. a radio link 150 when present in the cell 115. The second user equipment 122 is further capable of communicating with other user equipments, such as, e.g. the first user equipment 121 described above or another user equipment using wireless D2D communication, over the D2D link 140.

It should be noted that the first user equipment 121 and the second user equipment 122 may be user equipments, such as, mobile terminals, wireless terminals, mobile phones, smartphones, computers (such as e.g. stationary computers, laptops, Personal Digital Assistants (PDAs) or tablet computers, etc., with wireless capability), Machine to Machine (M2M) devices or any other radio network modules capable to communicate over a radio link in the wireless telecommunication network 100.

It should also be noted that a large number of user equipments may be located in the wireless telecommunication network 100. The first and second user equipments 121, 122 may be seen as one pair of user equipments using D2D communication, i.e. a D2D pair of UEs, among many more D2D pairs of user equipments.

According to the prior art, D2D communication between the first and second user equipments 121, 122 as described above is possible when the D2D communication has been established as or has fallen back to ad-hoc mode D2D communication. That is, the D2D link 140 between the first and second user equipments 121, 122 has been established and/or is controlled and maintained by only the first and second user equipments 121, 122 themselves. This is due to a lack of coverage of a LTE cellular network.

According to embodiments described herein network-assisted D2D communication between the first and second user equipments 121, 122, i.e. user equipments in a wireless communication network using a different RAT than a RAT that can be used for D2D communication, is enabled. A more detailed description of these embodiments is described below with reference to FIGS. 2-11.

Figure 2:
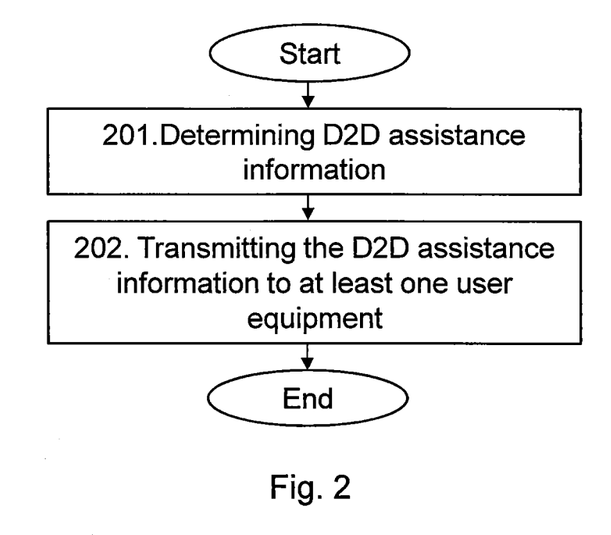
FIG. 2 is a flowchart depicting embodiments of a method in a network node.

Example of embodiments of a method performed by a network node 101, 102 for enabling network-assisted D2D communications between user equipments 121, 122 configured to be in a wireless telecommunications network 100, will now be described with reference to a flowchart depicted in FIG. 2. Further optional actions of the method are described with reference to the signalling diagram depicted in FIG. 5. The network node 101, 102 is configured according to a Radio Access Technology, RAT, that cannot be used for D2D communications. FIG. 2 is an illustrated example of exemplary actions or operations which may be taken by the network node 101, 102. The method may comprise the following actions.

Action 201

In this action, the network node 101, 102 determines D2D assistance information to enable network-assisted D2D communications by the network node 101, 102.

This advantageously enable the network node 101, 102 that is configured according to a RAT that cannot be used for D2D communications, to indicate or provide D2D assistance information, such as, e.g. network access related configuration and/or RRM information for D2D communications, to the first or second user equipment 121, 122 in the wireless communication network 100 in spite of using a RAT that cannot be used for D2D communications.

In some embodiments, the network node 101, 102 may determine whether or not the first and/or second user equipment 121, 122 may acquire assistance for D2D communications from the network node 101, 102; that is, the network node 101, 102 may determine whether D2D communications is allowed/supported in the cell 115 in the network node 101, 102. This enables the network node 101, 102 to notify the first and/or second user equipment 121, 122 so that the first or second user equipment 121, 122 may determine whether or not to camp on this non-LTE cellular network, i.e. foreign RAT, to acquire assistance from the network via the network node 101, 102.

In some embodiments, the network node 101, 102 may determine Radio Resource Management, RRM, configuration information to be used for data transfer in D2D communications. For example, this may comprise a static or semi-static resources partition, e.g. rough interference coordination information. In this case, the network node 101, 102 may, for example, indicate the resources, both in the time and frequency domain, allocated for discovery beacons and/or connection-less data transfers when operating a D2D communication. This may be performed in order to alleviate inter/intra-cell interference in the network. The RRM configuration information may also relate to RRM related operations, such as, e.g. resource allocation, power control, mode selection, link adaptation, etc., of the D2D communication.

In some embodiments, the network node 101, 102 may determine that connectivity for the first and/or second user equipment 121, 122 to a core network node is available via the network node 101, 102. The core network node may then provide assistance for the first and/or second user equipment 121, 122 to applications and/or services of D2D communications in the first and/or second user equipment 121, 122.

One example of such a core network node is a ProSe-F, Promoting Standardization for Embedded Systems-Functional, node. A ProSe-F node is a functional entity that is located in the core network, and which provides network assistance for the services and applications in user equipments that uses D2D communication. However, currently the ProSe-F node is only defined with an interface, commonly denoted PC4, to an EPC, Evolved Packet Core, node which may be used for LTE radio access towards user equipments. By configuring the network node 101, 102 with a defined interface between the ProSe-F (and may be also any associated servers) to core network nodes other than EPC nodes, such as, e.g. network nodes in the UMTS core network, user equipments may be enabled to connect to the ProSe-F node also under UMTS coverage. This would advantageously allow D2D applications in user equipments to use application-level network assistance for its D2D communication even when in UMTS coverage.

Action 202

After determining the D2D assistance information, the network node 101, 102 transmits the D2D assistance information to at least one user equipment 121, 122. Thus, the network node 101, 102 that is configured according to a RAT that cannot be used for D2D communications may indicate or provide D2D assistance information, such as, e.g. network access related configuration and/or RRM information for D2D communications, to the first and/or second user equipment 121, 122 in the wireless communication network 100 in spite of using a RAT that cannot be used for D2D communications.

In some embodiments, the network node 101, 102 may transmit the D2D assistance information at least in part by system information broadcast signalling. By including the D2D assistance information in the system information that is broadcasted by the network node 101, 102 in the non-LTE cellular network, the D2D assistance information may be made available to the first and/or second user equipment 121, 122 at an early stage, e.g. even before connecting to the network node 101, 102. Furthermore, by broadcasting the D2D assistance information, less signalling resources are used as compared to, for example, transmitting the D2D assistance information separately to each user equipment. The system broadcast signalling may here be similar to the System Information Block, SIB, information transmitted by a network node in an LTE cellular network.

The broadcasted D2D assistance information may in some embodiments comprise a determined indication of whether or not the first and/or second user equipment 121, 122 may acquire assistance for D2D communications from the network node 101, 102. Thus, the network node 101, 102 may notify the first and/or second user equipment 121, 122 of whether D2D communications is allowed/supported by the network node 101, 102, so that the first and/or second user equipment 121, 122 may determine whether or not to camp on this non-LTE cellular network of the network node 101, 102 to acquire assistance for D2D communications from the network.

In some embodiments, the broadcasted D2D assistance information may comprise determined network access related configuration information for D2D communications and/or determined RRM configuration information to be used for data transfer in D2D communications.

In some embodiments, the broadcasted D2D assistance information may comprise a determined indication of the connectivity to a core network node that is available via the network node 101, 102 to the first and/or second user equipment 121, 122. Thus, the first and/or second user equipment 121, 122 is notified that it may establish a connection to this core network node, e.g. ProSe-F node, even when using a RAT that cannot be used for D2D communications. This determined indication may also be sent to the first and/or second user equipment 121, 122, e.g. as user equipment dedicated signalling as described below, in response to a request from the first and/or second user equipment 121, 122.

In some embodiments, the network node 101, 102 may transmit the D2D assistance information at least in part by user equipment dedicated signalling. Thus, the D2D assistance information may comprise user equipment dedicated information, such as, e.g. user equipment dedicated LTE radio resources for LTE-based D2D over the non-LTE cellular network of the network node 101, 102. For example, in terms of different RRM-related aspects, such as, for example, scheduling, mode selection, power control, link adaptation, etc. In general, by having the network node 101, 102 control the radio resources individually for each user equipment in this manner, it is typically possible to achieve a better capacity for the user equipments than when the radio resources are controlled in a distributed manner, e.g. by user equipments themselves based on broadcasted information. However, a compromise between central and distributed RRM may be considered, since potential drawbacks with a centralized RRM solution are, for example, higher signalling load and potentially higher latency.

This may also be performed in addition to a previous broadcast signalling. It should be noted that the D2D assistance information may be divided between being transmitted in system information broadcast signalling or user equipment dedicated signalling in any suitable manner, i.e. information described above broadcasted as system information to the first and/or second user equipment 121, 122 may also be transmitted using user equipment dedicated signalling.

To implement this, the user equipment dedicated information may be signalled or carried in different ways. According to one example, the user equipment dedicated signalling may use LTE control signal information containers. The LTE control signal information containers, which also may be referred to as LTE control information elements, may be configured and transmitted by the network node 101, 102 over the non-LTE cellular network. In this way, the control mechanism for D2D in the network node 101, 102 may be limited to LTE signalling format, and the complexity of implementation corresponding features in the first and/or second user equipment 121, 122 may be relaxed.

Alternatively, according to another example, the user equipment dedicated signalling may use signalling according to the non-LTE cellular network of the network node 101, 102 directly.

Figure 3:
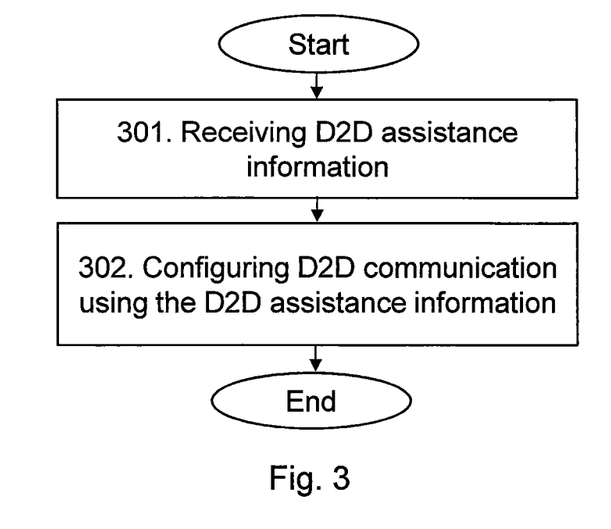
FIG. 3 is a flowchart depicting embodiments of a method in a user equipment.

Example of embodiments of a method performed by a first user equipment 121 for configuring a D2D communication with a second user equipment 122 in a wireless telecommunications network 100, will now be described with reference to a flowchart depicted in FIG. 3. Further optional actions of the method are described with reference to the signalling diagram depicted in FIG. 5. FIG. 3 is an illustrated example of exemplary actions or operations which may be taken by the first user equipment 121. The method may comprise the following actions.

Action 301

In this action, the first user equipment 121 receives D2D assistance information from a network node 101, 102 configured according to a RAT that cannot be used for D2D communications, i.e. a non-LTE cellular network. This is performed to enable network-assisted D2D communications when being served by the network node 101, 102. The D2D assistance information may be received from the network node 101, 102 at least in part as system broadcast information and/or as a user equipment dedicated signalling transmission.

This enables the first user equipment 121 to e.g. determine whether or not to camp on this foreign RAT to acquire assistance from the network, follow configuration information of the D2D assistance information to access the network to acquire further assistance information, configure the D2D link according to RRM configuration information of the D2D assistance information, or connect to a core network node for assistance with applications and/or services of the D2D communication.

In some embodiments, the first user equipment 121 may also send a request to the network node 101, 102 to ask whether or not a core network node, such as, e.g. a ProSe-F node, is available. In this case, the first user equipment 121 may then receive an indication in response from network node 101, 102 e.g. Y/N (Yes/No) or similar.

Action 302

After receiving the D2D assistance information, the first user equipment 121 configures the D2D communication using the received D2D assistance information.

Figure 4:
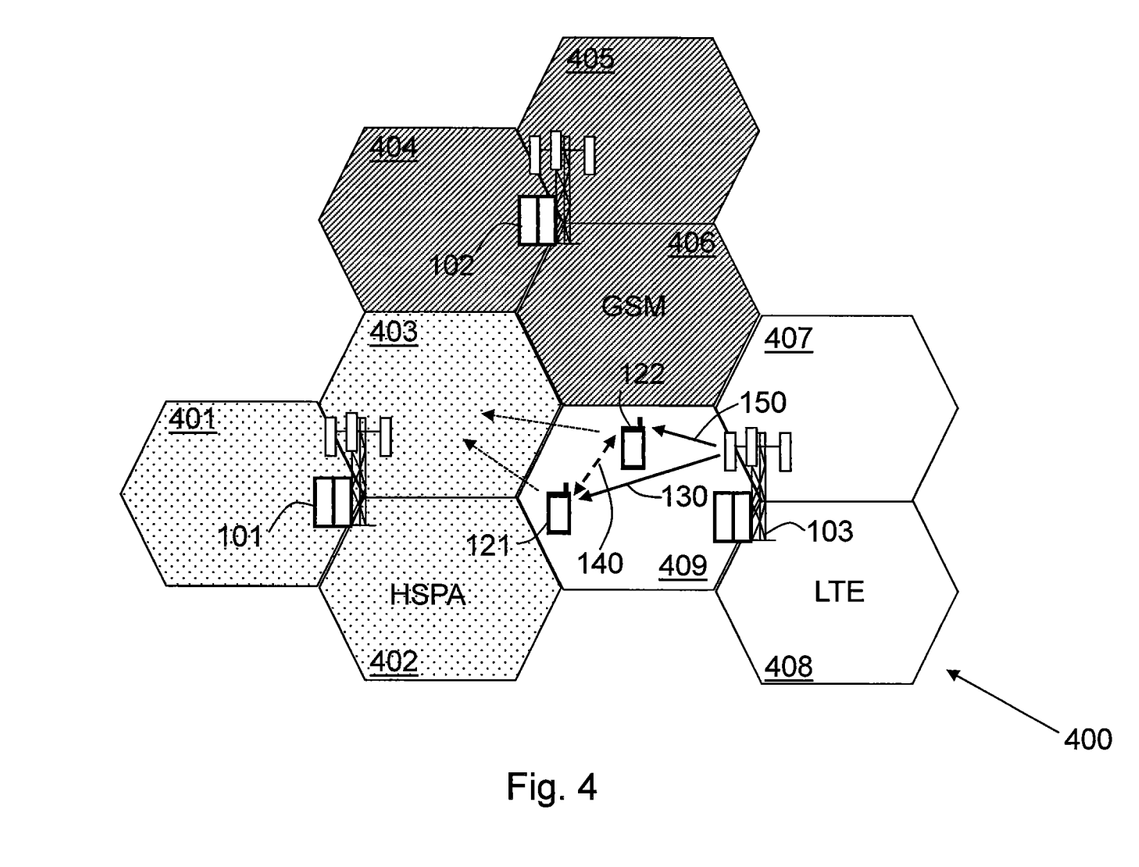
FIG. 4 is a schematic block diagram illustrating embodiments of network nodes and user equipments in a wireless communication network.

FIG. 4 depicts a wireless communications network 500 comprising a number of network nodes 101, 102, 103. The network node 101 is configured to provide access within the wireless communications network 400 over a radio link to user equipments in its corresponding cells 401, 402, 403. In this example, the network node 101 is configured according to a RAT that cannot be used for D2D communications, here, a WCDMA/HSPA cellular network. Similarly, the network node 102 is configured to provide access within the wireless communications network 400 over a radio link to user equipments in its corresponding cells 404, 405, 406. In this example, the network node 102 is configured according to a RAT that cannot be used for D2D communications, here, a GSM cellular network. The network node 103 is here configured to provide access within the wireless communications network 400 over a radio link to user equipments in its corresponding cells 407, 408, 409. In this example, the network node 103 is configured according to a RAT that can be used for D2D communications, here, a LTE cellular network. The network nodes 101, 102, 103 may be connected and configured to communicate with each other over a core network (not shown).

In this scenario, the first and second user equipment 121, 122 are engaged in a D2D communication in cell 409 of the network node 103. Here, since the network node 103 uses a RAT that can be used for D2D communications, the D2D communication may be network-assisted by the network node 103. However, the first and second user equipment 121, 122 are about to enter cell 403 of the network node 101, which use a RAT that cannot be used for D2D communications, e.g. WCDMA/HSPA.

Figure 5:
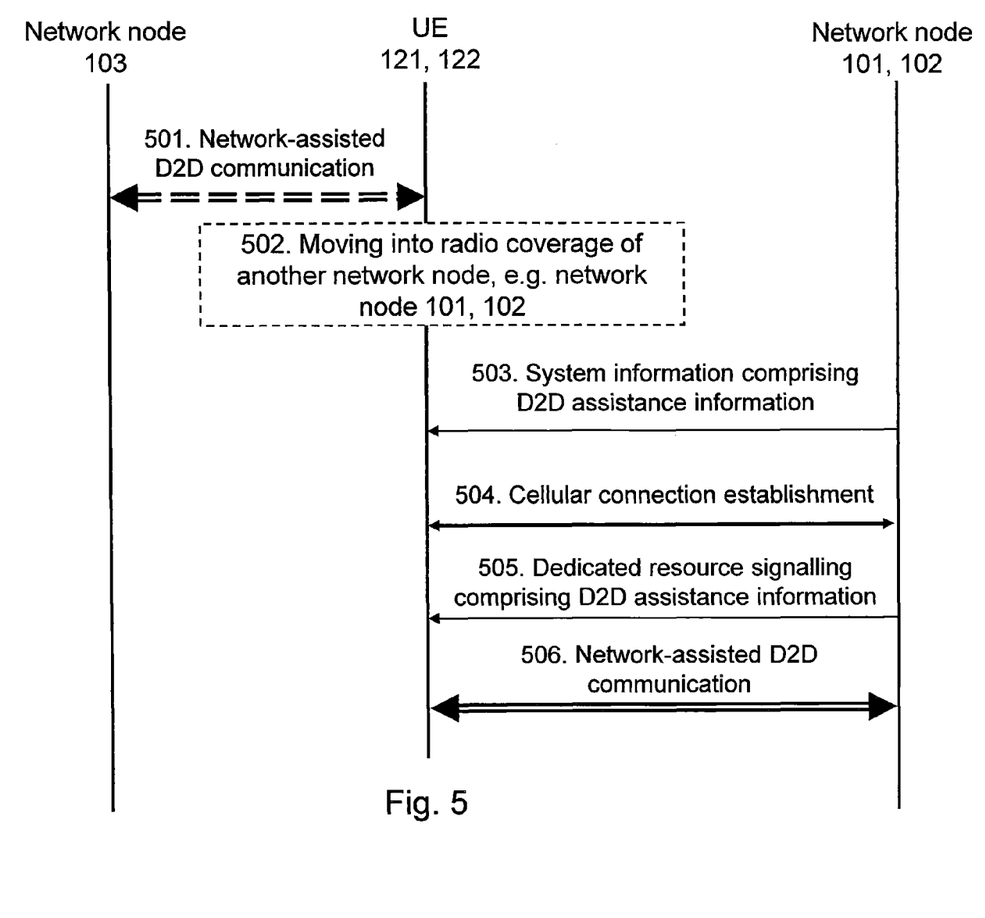
FIG. 5 is a schematic signalling diagram depicting embodiments of methods in network nodes and a user equipment.

This may trigger signalling according to the example described in more detail with reference to FIG. 5 below.

Example of embodiments of methods performed by the network node 101, user equipments 121, 122 and the network node 103 for enabling network-assisted D2D communications between the user equipments 121, 122, will now be described with reference to the schematic signalling diagram depicted in FIG. 5. FIG. 5 is a simplified illustrated example of exemplary actions or operations which may be taken by the involved network nodes and user equipments. It should be noted that, for the sake of clarity, further communications taken place between the network nodes and user equipments having no significant effect on the embodiments may have be excluded herein.

Action 501

In this action, the first and second user equipment 121, 122 are engaged in a D2D communication assisted by the network node 103, i.e. the network node 103 provides network-assisted D2D communication to the first and/or second user equipment 121, 122, e.g. in a cell 409 as shown in FIG. 4.

Action 502

In this action, the first and second user equipment 121, 122 move out of radio coverage of the network node 103. When moving out of the radio coverage of the network node 103, only radio coverage of the network node 101, i.e. the WCDMA/HSDPA cellular network, may be available. Then, the first and/or second user equipment 121, 122 must decide whether the first and second user equipment 121, 122 is to operate in the coverage of the network node 101, i.e. the WCDMA/HSDPA cellular network.

Action 503

When detecting that the first and second user equipment 121, 122 is moving into radio coverage of the network node 101, the network node 101 may perform a system broadcast signalling comprising D2D assistance information to the first and/or second user equipment 121, 122 according to the embodiments as described above with reference to FIG. 2. Here, the first and/or second user equipment 121, 122 may receive the system broadcast signalling comprising D2D assistance information according to the embodiments as described above with reference to FIG. 3.

For example, some D2D assistance information may be broadcasted by the network node 101 which may indicate that the first and/or second user equipment 121, 122 are accessing a WCDMA/HSDPA cellular network which may provide network-assisted D2D communications, e.g. a network comprising the network node 101. In receiving this information, the first and/or second user equipment 121, 122, which are inter-RAT capable, may determine to establish a cellular connection with the network node 101 as shown in Action 504.

Action 504

The first and second user equipment 121, 122 may then perform a cellular connection establishment together with the network nodes 101, 103.

Action 505

When detected that the first and second user equipment 121, 122 has been handed over to the network node 101, the network node 101 may perform user equipment dedicated signalling comprising D2D assistance information to the first and/or second user equipment 121, 122 according to the embodiments as described above with reference to FIG. 2.

For example, for a WCDMA/HSDPA cellular network, the D2D assistance information may be comprised in, or carried by, a High-Speed Control CHannel (HSCCH), a Control Element for Medium Access Control (MAC CE), an Radio Resource Control (RRC) or Mobility Management (MM) message according to the defined format of the WCDMA/HSDPA system. In this way, the user equipment dedicated signalling overhead when using e.g. a LTE information container is removed. However, this comes at the cost of an increase of user equipment implementation complexity.

Thus, some user equipment dedicated signalling from the network node 101 may further assists the D2D communication for the first and second user equipment 121, 122 in terms of e.g. RRM related aspects.

Action 506

When the first and/or second user equipment 121, 122 has received the D2D assistance information, the first and/or second user equipment 121, 122 may configure the D2D communication and thus operate the D2D communication with assistance from the network node 101 in the WCDMA/HSDPA cellular network.

Figure 6:
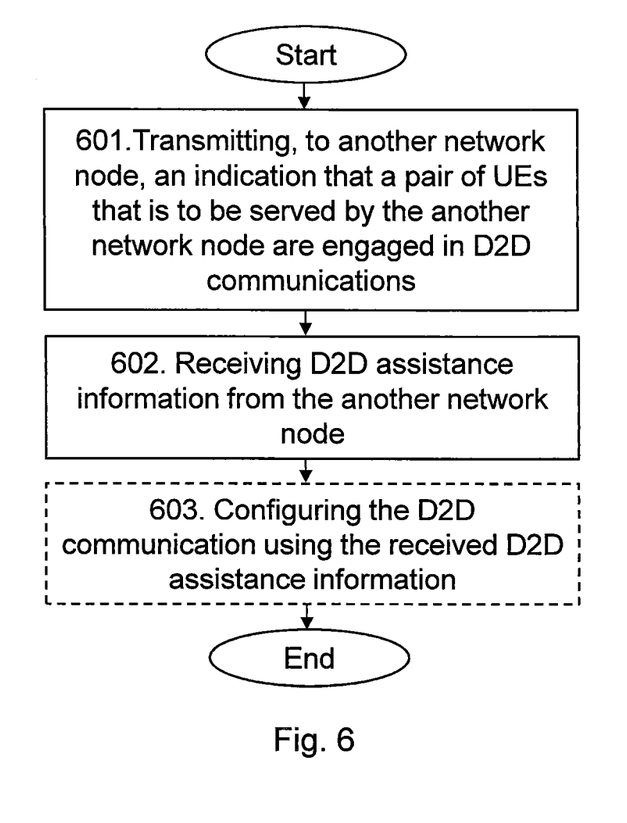
FIG. 6 is another flowchart depicting embodiments of a method in a network node.

Example of embodiments of a method performed by the network node 103 for enabling network-assisted D2D communications between user equipments 121, 122 configured to be in a wireless telecommunications network 400, will now be described with reference to a flowchart depicted in FIG. 6. Further optional actions of the method are described with reference to the signalling diagram depicted in FIG. 8. The network node 103 is configured according to a RAT that can be used for D2D communications, such e.g. an eNodeB in a LTE network. FIG. 6 is an illustrated example of exemplary actions or operations which may be taken by the network node 103. The method may comprise the following actions.

Action 601

In this action, the network node 103 transmits to another network node an indication that a user equipment that is to be served by the another network node is engaged in D2D communications; the another network node here being configured according to a RAT that cannot be used for D2D communications.

For example, the another network node may be a network node 101, 102 and the user equipments may be one of the first and/or second user equipment 121, 122. In some embodiments, this may be performed by the network node 103 via e.g. a Mobility Management Entity, MME, node in the wireless communication system 400 (not shown). This may be performed by transmitting a forward relocation request, e.g. as described below in Action 802 with reference to FIG. 8.

Action 602

In this action, the network node 103 receives from the another network node D2D assistance information to enable network-assisted D2D communications for the user equipment by the another network node. In some embodiments, this may be performed by the network node 103 via e.g. an MME, which may receive the D2D assistance information via a Serving GPRS Support Node, SGSN, from the network node 101 in the wireless communication system 400 (not shown). This may be performed by receiving a forward relocation response, e.g. as described below in Action 803 with reference to FIG. 8.

Action 603

In this optional action, the network node 103 may configure the D2D communication for the user equipment using the received D2D assistance information. This may be performed by sending a EUTRA command, e.g. as described below in Action 804 with reference to FIG. 8.

Figure 7:
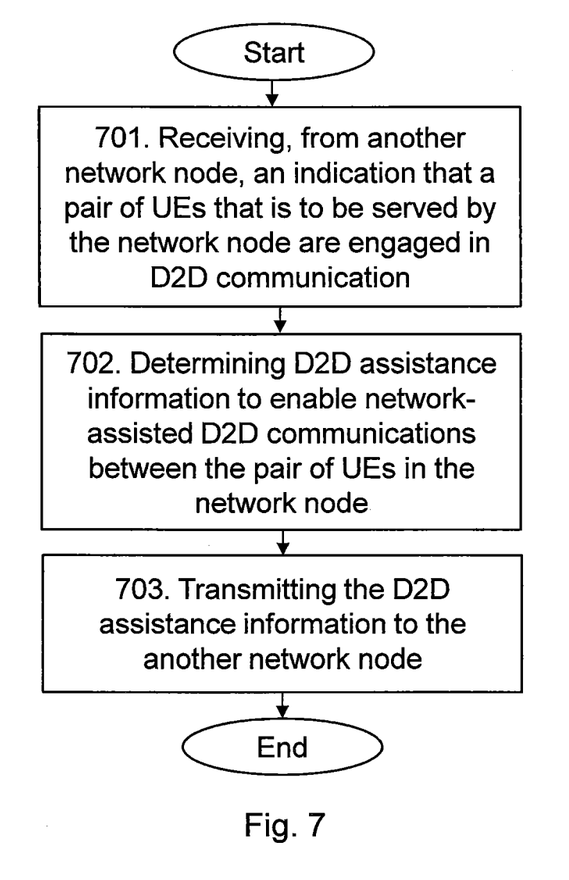
FIG. 7 is a further flowchart depicting embodiments of a method in a network node.

Example of embodiments of a method performed by the network node 101, 102 for enabling network-assisted D2D communications between user equipments 121, 122 configured to be in a wireless telecommunications network 100, will now be described with reference to a flowchart depicted in FIG. 7. Further optional actions of the method are described with reference to the signalling diagram depicted in FIG. 8. The network node 101, 102 is configured according to a RAT that cannot be used for D2D communications, such as, e.g. a network node in a GSM or WCDMA network. FIG. 7 is an illustrated example of exemplary actions or operations which may be taken by the network node 101, 102 in addition to the actions or operation described above with reference to FIG. 2.

The method may comprise the following actions.

Action 701

In this action, the network node 101, 102 may receive from another network node, an indication that a user equipment that is to be served by the network node 101, 102 is engaged in D2D communication. For example, the another network node may be a network node 103 and the user equipments may be one of the first and/or second user equipment 121, 122. This may be performed by the network node 101, 102 via its Serving GPRS Support Node, SGSN, in the wireless communication system 400 (not shown). This may be performed by receiving a forward relocation request, e.g. as described below in Action 802 with reference to FIG. 8.

Action 702

After receiving the indication, the network node 101, 102 may determine assistance information to enable network-assisted D2D communications for the user equipment 121, 122 by the network node 101, 102.

Action 703

In this action, the network node 101, 102 may transmit the determined D2D assistance information to the another network node, e.g. the network node 103. This may be performed by the network node 101, 102 via its Serving GPRS Support Node, SGSN, in the wireless communication system 400 (not shown). This may be performed by transmitting a forward relocation response, e.g. as described below in Action 803 with reference to FIG. 8.

Figure 8:
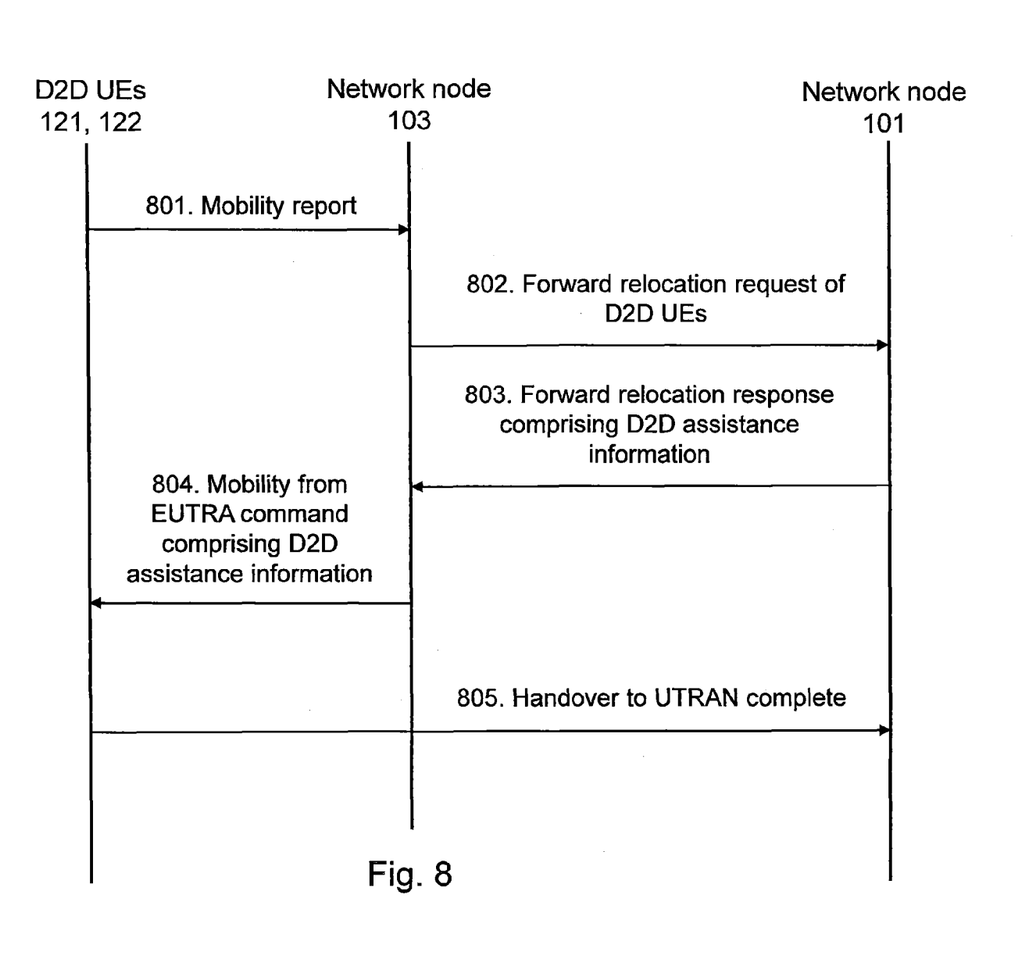
FIG. 8 is another schematic signalling diagram depicting embodiments of methods in network nodes and a user equipment.

Example of embodiments of methods performed by the network node 101, a user equipment 121, 122 and the network node 103 for enabling network-assisted D2D communications between user equipments 121, 122, will now be described with reference to the schematic signalling diagram depicted in FIG. 8. FIG. 8 is a simplified illustrated example of exemplary actions or operations which may be taken by the involved network nodes and user equipments. For the sake of clarity, further communications taken place between the network nodes and user equipments having no significant effect on the embodiments herein may be excluded herein.

The schematic signalling diagram in FIG. 8 illustrates information sharing signalling on a D2D activity between different RAT network entities. That is, information sharing signalling for a D2D communication between the first and second user equipment 121, 122 as the first and second user equipment 121, 122 are moving from a RAT that can be used for D2D communications, i.e. a LTE cellular network, to a RAT that cannot be used for D2D communications, i.e. a non-LTE cellular network.

If this inter-RAT information sharing signalling as described in the embodiments herein is enabled, then an inter-RAT D2D activity mobility can be supported.

For the content of the inter-RAT information sharing signalling, and in order to ensure a smooth transition of a D2D link moving from one RAT to another RAT, the following coordination or negotiation for the inter-RAT mobility between the network node 103 and network node 101 for the first and second user equipment 121, 122 engaged in a D2D communication may be performed.

FIG. 8 shows an example of some embodiments, wherein the first and second user equipment 121, 122 engaged in a D2D communication is moving from a 3GPP E-UTRAN system coverage, i.e. a LTE cellular network, to a UTRAN system, i.e. a non-LTE cellular network.

Action 801

In this action, the first and second user equipment 121, 122 are engaged in a D2D communication assisted by the network node 103, i.e. the network node 103 provides network-assisted D2D communication to the first and/or second user equipment 121, 122, e.g. in a cell 409 as shown in FIG. 4. However, when the first and second user equipment 121, 122 moves to the boundary between two different systems, e.g. close to the border between cell 409 of network node 103 and cell 403 of network node 101 as shown in FIG. 4, a measurement report is sent from the first and second user equipment 121, 122 to the network, to indicate their mobility status.

Action 802

When receiving the measurement report from the first and/or second user equipment 121, 122, the network node 103 may transmit an indication that the first and second user equipment 121, 122 that are to be served by the network node 101 are engaged in D2D communications, wherein the network node 101 is configured according to a RAT that cannot be used for D2D communications. This is because the network node 103 may know from the measurement report that the target system, i.e. the network node 101, is configured according to a RAT that cannot be used for D2D communications.

In some embodiments, this may be performed via a Mobility Management Entity, MME, of the network node 103 that may send a Forward Relocation Request to the Serving GPRS Support Node, SGSN, of the network node 101 over an S3 interface. In some embodiments, to e.g. differentiate the request from other requests, the request may comprise a new information field that may indicate that this is a D2D mobility event.

Action 803

In this action, the network node 101 may respond to the Forward Relocation Request via the SGSN with a 'Forward relocation response'. This 'Forward relocation response' may comprise some D2D assistance information, such as, for example, assistance information for the D2D access in the RAT of the network node 101, e.g. whether the D2D mobility is accepted or not, resource usage and power limit allowed if accepted, etc.

Action 804

When receiving this 'Forward relocation response' from the network node 101, the network node 103 may send a mobility message or handover command to indicate that the first and second user equipment 121, 122 are to handover to the network node 101. The mobility message or handover command may be a EUTRA command. In some embodiments, some D2D assistance information received in the 'Forward relocation response' may be comprised in, or piggybacked in, the mobility message or handover command, e.g. the resource usage and power limit as indicated in Action 803.

Action 805

When receiving the mobility message or handover command from the network node 103, the first and second user equipment 121, 122 may switch to the network node 101 and a "Handover to UTRAN complete" message may be sent to the network node 101 after the handover is done. In some embodiments, e.g. in a cellular GSM network, this message may be a so called "XID" message, which may implicitly indicate a successful handover to the network node 101.

Figure 9:
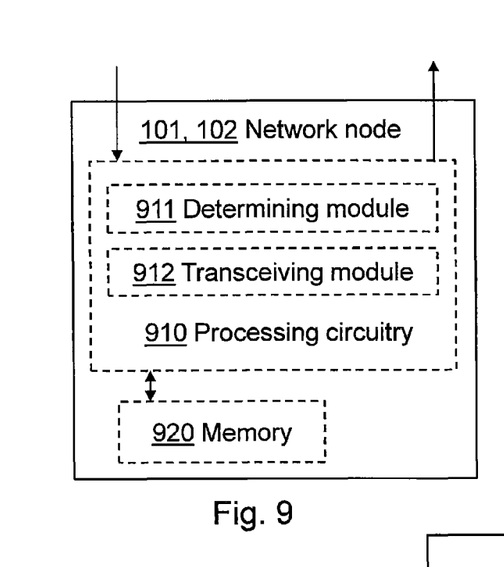
FIG. 9 is a block diagram depicting embodiments of a network node.

To perform the method actions in the network node 101, 102 for enabling network-assisted D2D communications between user equipments 121, 122 configured to be in a wireless telecommunications network 100, wherein the network node 101, 102 is configured according to a RAT that cannot be used for D2D communications, the network node 101, 102 may comprise the following arrangement depicted in FIG. 9.

FIG. 9 shows a schematic block diagram of embodiments of the network node 101, 102. In some embodiments, the network node 101, 102 may comprise a determining module 911 and a transceiving module 912. In some embodiments, the network node 101, 102 may comprise a processing circuitry 910, which may also be referred to as processing module. The processing circuitry 910 may comprise one or more of the determining module 911 and the transceiving module 912, and perform the function thereof as described below.

The determining module 911 is configured to determine D2D assistance information to enable network-assisted D2D communications by the network node 101, 102. The transceiving module 912 is configured to transmit the D2D assistance information to the user equipments 121, 122 or to another network node 103 in the wireless telecommunications network 100.

In some embodiments, the transceiving module 912 may be configured to transmit the D2D assistance information at least in part by system information broadcast signalling. In some embodiments, the D2D assistance information may comprise an indication of whether or not a user equipment 121, 122 may acquire assistance for D2D communications from the network node 101, 102. In some embodiments, the D2D assistance information may comprise network access related configuration information for D2D communications, and/or Radio Resource Management, RRM, configuration information to be used for data transfer in the D2D communication.

In some embodiments, the transceiving module 912 may be configured to transmit the D2D assistance information at least in part by user equipment dedicated signalling. In some embodiments, the transceiving module 912 may be configured to use 3GPP LTE control signal information containers in the user equipment dedicated signalling.

In some embodiments, the determining module 911 may be configured to determine D2D assistance information by determining that connectivity for user equipments 121, 122 to a core network node, which core network node provides assistance to applications and/or services of D2D communications in user equipments, is available via the network node 101, 102. In such cases, the transceiving module 912 may be configured to transmit the D2D assistance information by transmitting an indication of this connectivity to the user equipments 121, 122 as part of the D2D assistance information.

In some embodiments, the transceiving module 912 may be configured to receive an indication that a pair of user equipments 121, 122 engaged in D2D communications is to be served by the network node 101, 102 from another network node 103. Here, in some embodiments, the determining module 911 is configured to determine D2D assistance information to enable network-assisted D2D communications between the pair of user equipments 121, 122) by the network node 101, 102. Then, the transceiving module 912 may be configured to transmit the D2D assistance information to the another network node 103.

The embodiments for enabling network-assisted D2D communications between user equipments 121, 122 configured to be in a wireless telecommunications network 100 may be implemented through one or more processors, such as, e.g. the processing circuitry 910 in the network node 101, 102 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 910 in the network node 101, 102. The computer program code may e.g. be provided as pure program code in the network node 101, 102 or on a server and downloaded to the network node 101, 102.

The network node 101, 102 may further comprise a memory 920 comprising one or more memory modules. The memory 920 may be arranged to be used to store data, such as, e.g. D2D assistance information, to perform the methods described herein when being executed in the network node 101, 102. Those skilled in the art will also appreciate that the processing circuitry 910 and the memory 920 described above may refer to a combination of analog and digital circuits, and/or one or more processors configured with software and/or firmware, e.g. stored in a memory, that when executed by the one or more processors such as the processing circuitry 910 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
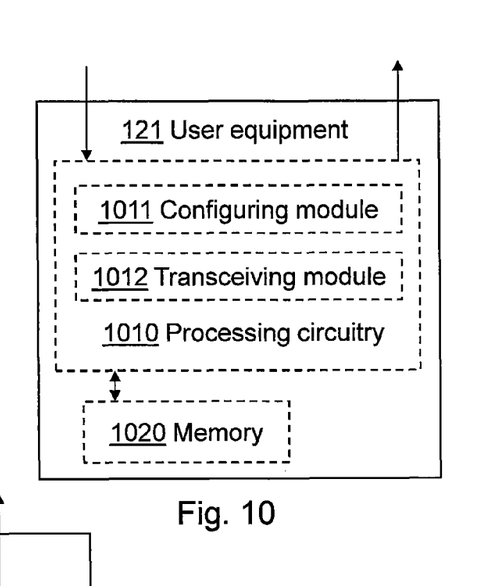
FIG. 10 is a block diagram depicting embodiments of a user equipment.

To perform the method actions in the user equipment 121 for configuring a D2D communication with another user equipment 122 in a wireless telecommunications network 100, the user equipment 121 may comprise the following arrangement depicted in FIG. 10.

FIG. 10 shows a schematic block diagram of embodiments of the user equipment 121. In some embodiments, user equipment 121 may comprise a configuring module 1011 and a transceiving module 1012. In some embodiments, the user equipment 121 may comprise a processing circuitry 1010, which may also be referred to as processing module. The processing circuitry 1010 may comprise one or more of the determining module 1011 and the transceiving module 1012, and perform the function thereof as described below.

The transceiving module 1012 is configured to receive D2D assistance information to enable network-assisted D2D communications when being served by a network node 101, 102 configured according to a RAT that cannot be used for D2D communications. The transceiving module 1012 may further be configured to receive the D2D assistance as part of receiving system broadcast information and/or a user equipment dedicated signalling transmission. The configuring module 1011 is configured to configure the D2D communication using the D2D assistance information.

The embodiments for configuring a D2D communication with another user equipment 122 in a wireless telecommunications network 100 may be implemented through one or more processors, such as, e.g. the processing circuitry 1010 in the user equipment 121 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1010 in the user equipment 121. The computer program code may e.g. be provided as pure program code in the user equipment 121 or on a server and downloaded to the user equipment 121.

The user equipment 121 may further comprise a memory 1020 comprising one or more memory modules. The memory 1020 may be arranged to be used to store data, such as, e.g. D2D assistance information, to perform the methods described herein when being executed in the user equipment 121. Those skilled in the art will also appreciate that the processing circuitry 1010 and the memory 1020 described above may refer to a combination of analog and digital circuits, and/or one or more processors configured with software and/or firmware, e.g. stored in a memory, that when executed by the one or more processors such as the processing circuitry 1010 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 11:
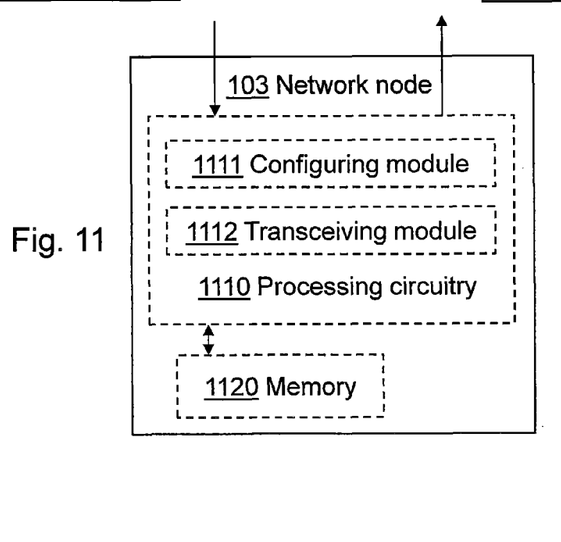
FIG. 11 is another block diagram depicting embodiments of a network node.

To perform the method actions in the network node 103 for enabling network-assisted D2D communications between user equipments 121, 122 configured to be in a wireless telecommunications network 100, wherein the network node 103 is configured according to a RAT that can be used for D2D communications, the network node 103 may comprises the following arrangement depicted in FIG. 11.

FIG. 11 shows a schematic block diagram of embodiments of the network node 103. In some embodiments, the network node 103 may comprise a configuring module 1111 and a transceiving module 1112. In some embodiments, the network node 103 may comprise a processing circuitry 1110, which may also be referred to as processing module. The processing circuitry 1110 may comprise one or more of the determining module 1111 and the transceiving module 1112, and perform the function thereof described below.

The transceiving module 1112 is configured to transmit an indication a user equipment 121, 122 that is to be served by another network node 101, 102 is engaged in D2D communications, wherein the another network node 101, 102 is configured according to a RAT that cannot be used for D2D communications. The transceiving module 1112 is further configured to receive D2D assistance information to enable network-assisted D2D communications for the user equipment 121, 122 by the network node 101, 102. The configuring module 1111 may be configured to configure the D2D communication for the user equipments 121, 122 using the received D2D assistance information.

The embodiments for enabling network-assisted D2D communications between user equipments 121, 122 configured to be in a wireless telecommunications network 100 may be implemented through one or more processors, such as, e.g. the processing circuitry 1110 in the network node 103 depicted in FIG. 11, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1110 in the network node 103. The computer program code may e.g. be provided as pure program code in the network node 103 or on a server and downloaded to the network node 103. The network node 103 may further comprise a memory 1120 comprising one or more memory modules. The memory 1120 may be arranged to be used to store data, such as, e.g. D2D assistance information, to perform the methods described herein when being executed in the network node 103.

Those skilled in the art will also appreciate that the processing circuitry 1110 and the memory 1120 described above may refer to a combination of analog and digital circuits, and/or one or more processors configured with software and/or firmware, e.g. stored in a memory, that when executed by the one or more processors such as the processing circuitry 1110 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The terminology used in the detailed description of the particular exemplary embodiments illustrated in the accompanying drawings is not intended to be limiting of the described methods, the network nodes 101, 102, 103 or the first user equipment 121, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

CE Control Element
D2D Device-to-Device
E-UTRAN Evolved Universal Terrestrial Radio Access
HSCCH High-Speed Control CHannel
MAC Medium Access Control
MM Mobility Management
MME Mobility Management Entity
OFDM Orthogonal Frequency-Division Multiplexing
ProSE Promoting Standardization for Embedded Systems
RAN Radio Access Network
RAT Radio Access Technology
RRC Radio Resource Control
RRM Radio Resource Management
SGSN Serving GPRS Support Node
TDD Time-Division Duplex
TDM Time-Division Multiplexed
UE User Equipment
UL Uplink
UTRAN Universal Terrestrial Radio Access

The invention claimed is:

1. A method performed by a network node to enable network-assisted Device-to-Device (D2D) communications between user equipments configured to be in a wireless telecommunications network, wherein the network node is configured according to a Radio Access Technology (RAT) that cannot be used for D2D communications, the method comprising:
    determining D2D assistance information to enable network-assisted D2D communications by the network node, wherein the determining further comprises determining that connectivity for at least one user equipment to a core network node is available via the network node, wherein the core network node provides assistance to applications and/or services of D2D communications in the at least one user equipment, and wherein the core network node is separate from the network node; and
    transmitting the D2D assistance information from the network node to the at least one user equipment, wherein transmitting further comprises transmitting an indication of the connectivity to the at least one user equipment as part of the D2D assistance information.

2. The method according to claim 1, wherein the transmitting is performed by the network node at least in part by system information broadcast signalling.

3. The method according to claim 2, wherein the D2D assistance information comprise an indication of whether or not a user equipment may acquire assistance for D2D communications from the network node.

4. The method according to claim 1, wherein the D2D assistance information comprise network access related configuration information for D2D communications, and/or Radio Resource Management (RRM) configuration information to be used for data transfer in the D2D communication.

5. The method according to claim 1, wherein the transmitting is performed by the network node at least in part by user equipment dedicated signalling.

6. The method according to claim 5, wherein user equipment dedicated signalling use 3GPP LTE control signal information containers.

7. The method according to claim 1, further comprising:
    receiving, from another network node, an indication that a user equipment that is to be served by the network node is engaged in D2D communication;
    determining D2D assistance information to enable network-assisted D2D communications for the user equipment by the network node; and
    transmitting the D2D assistance information to the another network node.

8. A network node to enable network-assisted Device-to-Device (D2D) communications between user equipments configured to be in a wireless telecommunications network, wherein the network node is configured according to a Radio Access Technology (RAT) that cannot be used for D2D communications, wherein the network node is configured to:
    determine D2D assistance information to enable network-assisted D2D communications by the network node, wherein determining D2D assistance information comprises determining that connectivity for user equipments to a core network node is available via the network node, wherein the core network node provides assistance to applications and/or services of D2D communications in user equipments, and wherein the core network node is separate from the network node, and
    transmit the D2D assistance information to the user equipments or to another network node in the wireless telecommunications network, wherein transmitting the D2D assistance information comprises transmitting an indication of this connectivity to the user equipments as part of the D2D assistance information.

9. The network node according to claim 8, further configured to transmit the D2D assistance information at least in part by system information broadcast signalling.

10. The network node according to claim 9, wherein the D2D assistance information comprise an indication of whether or not a user equipment may acquire assistance for D2D communications from the network node.

11. The network node according to claim 9, wherein the D2D assistance information comprise network access related configuration information for D2D communications, and/or Radio Resource Management (RMM) configuration information to be used for data transfer in the D2D communication.

12. The network node according to claim 8, further configured to transmit the D2D assistance information at least in part by user equipment dedicated signalling.

13. The network node according to claim 12, further configured to use 3GPP LTE control signal information containers in the user equipment dedicated signalling.

14. The network node according to claim 8, further configured to receive an indication that a pair of user equipments engaged in D2D communications is to be served by the network node from another network node, determine D2D assistance information to enable network-assisted D2D communications between the pair of user equipments by the network node, and transmit the D2D assistance information to the another network node.

15. A method performed by a user equipment to configure a Device-to-Device (D2D) communication with another user equipment in a wireless telecommunications network, the method comprising:
receiving D2D assistance information to enable network-assisted D2D communications when being served by a network node configured according to a Radio Access Technology (RAT) that cannot be used for D2D communications, wherein the D2D assistance information comprises an indication that connectivity to a core network node is available via the network node, wherein the core network node provides assistance to applications and/or services of D2D communications, and wherein the core network node is separate from the network node; and
configuring the D2D communication using the D2D assistance information, wherein configuring the D2D communication comprises connecting to the core network node via the network node for assistance with the applications and/or services of the D2D communication.

16. The method according to claim 15, wherein the receiving is performed as part of receiving system broadcast information and/or a user equipment dedicated signalling transmission.

17. A user equipment to configure a Device-to-Device (D2D) communication with another user equipment in a wireless telecommunications network, wherein the user equipment is configured to:
receive D2D assistance information to enable network-assisted D2D communications when being served by a network node configured according to a Radio Access Technology (RAT) that cannot be used for D2D communications, wherein the D2D assistance information comprises an indication that connectivity to a core network node is available via the network node, wherein the core network node provides assistance to applications and/or services of D2D communications, and wherein the core network node is separate from the network node, and
configure the D2D communication using the D2D assistance information, wherein configuring the D2D communication comprises connecting to the core network node via the network node for assistance with the applications and/or services of the D2D communication.

18. The user equipment according to claim 17, further configured to receive the D2D assistance as part of receiving system broadcast information and/or a user equipment dedicated signalling transmission.

* * * * *